(No Model.)

I. H. GRAHAM.
BAKING PAN.

No. 272,679.  Patented Feb. 20, 1883.

Witnesses
T. J. Keane
James B. Bowen

Inventor
Irving H. Graham
By his atty.
Edwin H. Brown

UNITED STATES PATENT OFFICE.

IRVING H. GRAHAM, OF HOPEWELL JUNCTION, NEW YORK.

BAKING-PAN.

SPECIFICATION forming part of Letters Patent No. 272,679, dated February 20, 1883.

Application filed May 23, 1882. (No model.)

*To all whom it may concern:*

Be it known that I, IRVING H. GRAHAM, of Hopewell Junction, in Dutchess county, and the State of New York, have invented a certain new and useful Improvement in Baking-Pans, of which the following is a specification.

The object of my improvement is to produce a baking-pan wherein loaves of bread may be baked without requiring that watching during the process which heretofore has been necessary.

To this end my improvement consists in a pan, for use in baking loaves of bread, having a false bottom elevated above the main bottom for supporting the bread, a top forming part of a hinged cover, and perforations in the sides and ends of the cover, below the top, adapted to be closed by the bread as it rises, so as to preclude the egress of vapor after a certain stage in the baking.

Figure 1:
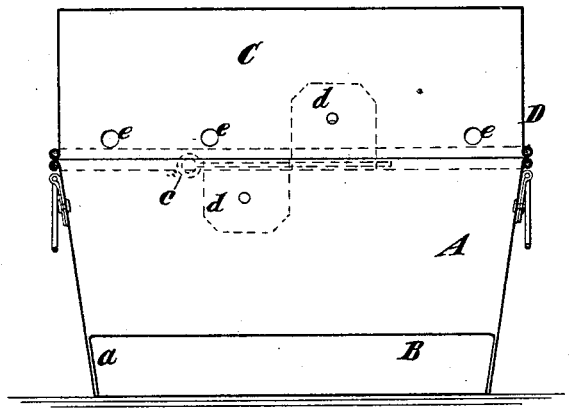
Figure 2:
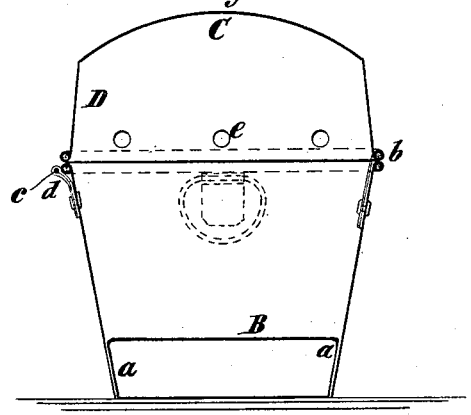

In the accompanying drawings, Figure 1 is a central longitudinal section of a baking-pan embodying my improvement, and Fig. 2 is a transverse section thereof.

Similar letters of reference designate corresponding parts in both figures.

A designates the body of the pan, which preferably has flaring ends and sides.

B designates a false bottom, made separable from the bottom of the pan, and supported above it by legs or ledges $a$, which rest on it. An air-space is left between the main bottom of the pan and this false bottom, and hence the danger of burning a loaf of bread placed in the pan is materially lessened, if not entirely obviated, even if the fire adjacent to which the pan is placed should be suddenly quickened through neglect in watching it.

C designates the top of the pan. It is of a rounded contour and forms part of a cover, D, which is connected to the body by hinges $b$ at the back, and secured thereto at the front by any suitable catch—as, for instance, by a pin, $c$, passing through two loops, $d$. This cover, at the sides and ends, is provided with perforations $e$, through which vapors driven off in baking may escape. These perforations, when thus located in the sides and ends, are preferable to perforations located in the top, as any dust or particles dropping on the pan will be less liable to gain access to it. The rounded top affords an opportunity for the loaf of bread to rise properly in baking. Preferably the front and back of the cover will flare downwardly, so that the cover may be easily opened after the loaf has expanded within it. Another advantage, due to the arrangement of the perforations below the top of the pan, is that after the crust of the loaf of bread rises above them the remaining moisture will be confined, and will prevent the burning or cracking of the crust in the further baking of the loaf.

The pan may be provided with any suitable handles—such, for instance, as those shown—whereby it may be conveniently lifted.

This pan is particularly desirable, because a loaf of bread may be baked in it without danger of burning, even if the fire by which it is baked is not closely watched.

I do not claim, broadly, a pan with a false bottom; nor do I claim, broadly, a pan provided with openings. I do, however, regard as of my invention a pan of approximately the form of a loaf of bread to be baked, having a false bottom for supporting the bread and preventing its burning, and provided with perforations which will be closed by the loaf of bread in rising, so as to preclude the egress of vapor after a certain stage in the baking.

What I claim as my invention, and desire to secure by Letters Patent, is—

A pan, for use in baking loaves of bread, having a false bottom elevated above the main bottom for supporting the bread, a top forming part of a hinged cover, and perforations in the sides and ends of the cover, below the top, adapted to be closed by the bread when it rises, substantially as and for the purpose specified.

IRVING H. GRAHAM.

Witnesses:
E. B. ALLEN,
HOWARD R. SCOFIELD.